No. 810,239. PATENTED JAN. 16, 1906.
N. WALBERG & F. J. McARTHUR.
FEEDING ATTACHMENT FOR THRESHERS.
APPLICATION FILED AUG. 29, 1903.
3 SHEETS—SHEET 1.
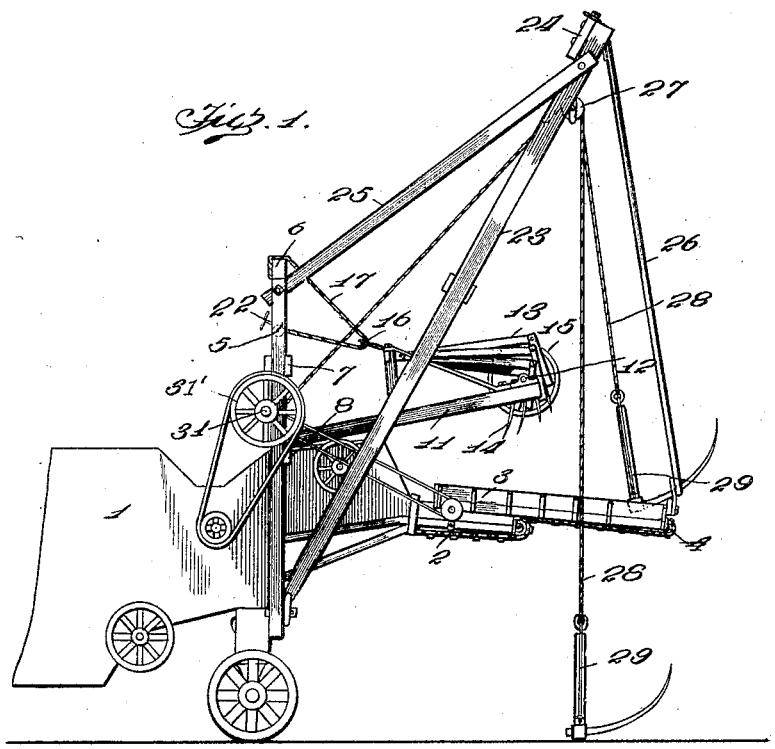

No. 810,239. PATENTED JAN. 16, 1906.
N. WALBERG & F. J. McARTHUR.
FEEDING ATTACHMENT FOR THRESHERS.
APPLICATION FILED AUG. 29, 1903.
3 SHEETS—SHEET 2.
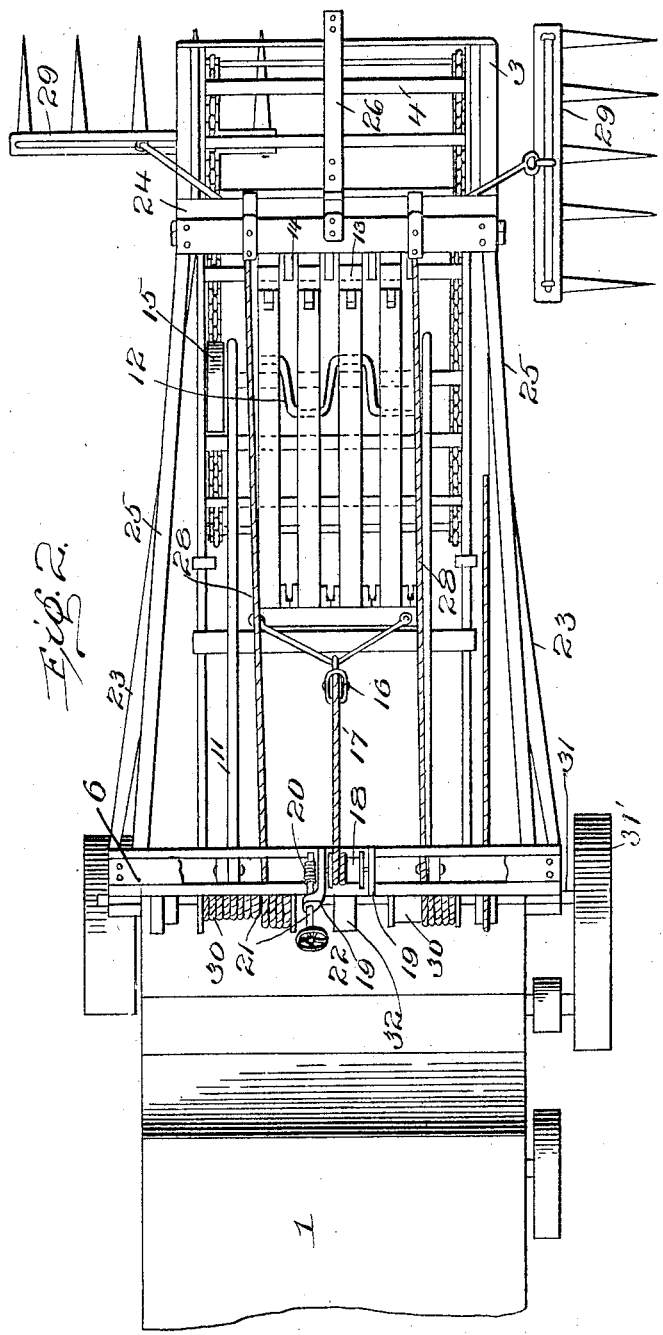

No. 810,239. PATENTED JAN. 16, 1906.
N. WALBERG & F. J. McARTHUR.
FEEDING ATTACHMENT FOR THRESHERS.
APPLICATION FILED AUG. 29, 1903.
3 SHEETS—SHEET 3.
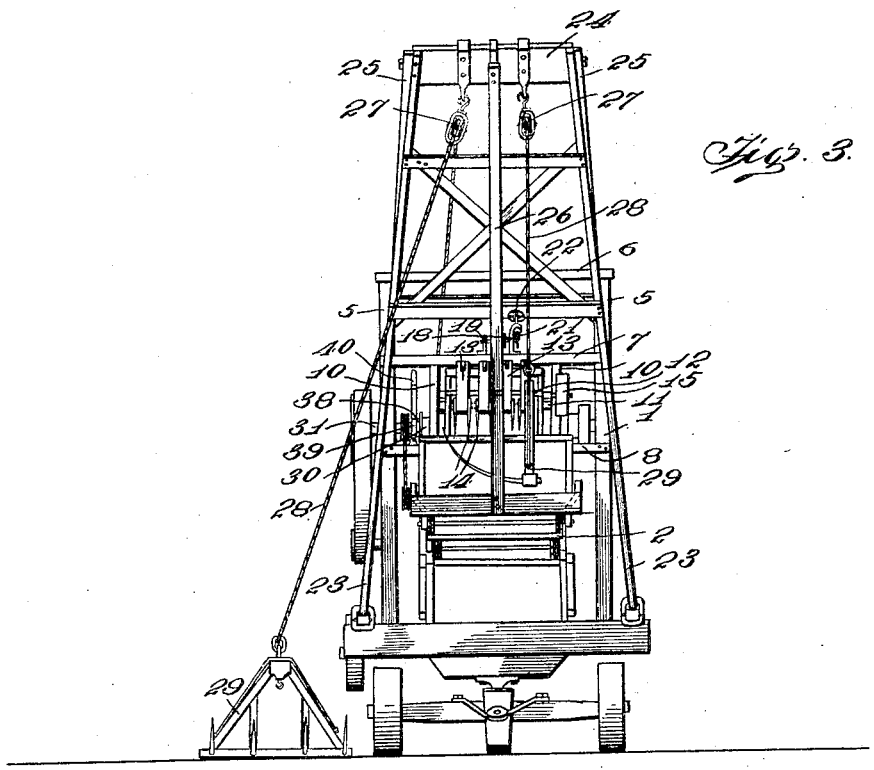
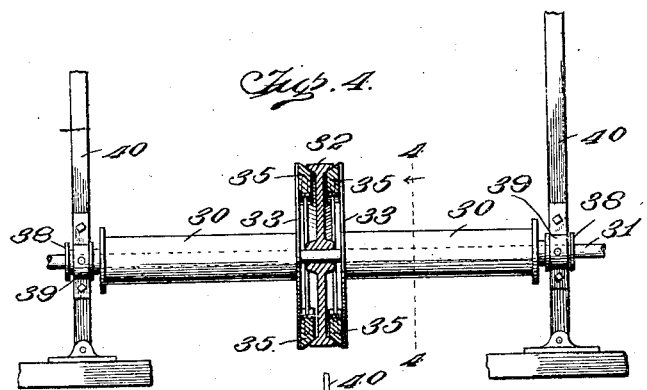
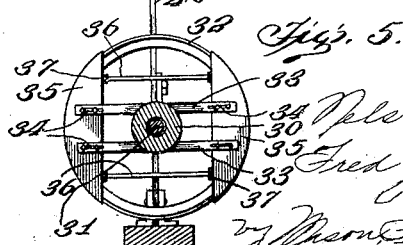

UNITED STATES PATENT OFFICE.

NELS WALBERG AND FRED J. McARTHUR, OF ABERDEEN, SOUTH DAKOTA.

FEEDING ATTACHMENT FOR THRESHERS.

No. 810,239.           Specification of Letters Patent.           Patented Jan. 16, 1906.

Application filed August 29, 1903. Serial No. 171,274.

*To all whom it may concern:*

Be it known that we, NELS WALBERG and FRED J. MCARTHUR, citizens of the United States of America, residing at Aberdeen, in the county of Brown and State of South Dakota, have invented certain new and useful Improvements in Feeding Attachments for Threshers; and we do hereby declare the following to be a full, clear, and exact description of the invention, such as will enable others skilled in the art to which it appertains to make and use the same.

This invention relates to improvements in feeding mechanism for threshing-machines, and particularly to a device adapted to distribute and deliver grain to be threshed to the threshing-roll of any of the well-known threshing-machines.

The object in view is the provision of mechanism for delivering grain rapidly and economically and for facilitating the control thereof. This object is carried out by the present invention, which consists, in combination with any suitable threshing-machine, of a support, a cable passed about the same, grain-conveying means carried by said cable, a drum engaged by the opposite end of said cable, a clutch, means for rotating one portion of said clutch, and means for throwing the drum into operative relation to the clutch.

It further consists in certain other novel constructions, combinations, and arrangements of parts, as will be hereinafter fully described and claimed.

In the accompanying drawings, Figure 1 represents a view in side elevation of a mechanism embodying the features of the present invention. Fig. 2 represents a top plan view of the same. Fig. 3 represents a front elevation of the same. Fig. 4 represents an enlarged detail elevation, partly in section, of the operating-drums and clutch. Fig. 5 represents a view in transverse section taken on the plane of line 4 4 of Fig. 4 looking in the direction of the arrow.

In the delivering of grain to threshing-machines it is common to provide an endless apron for feeding the grain into the thresher, and we propose to obviate the necessity for manually delivering bundles to such apron by the present invention, an embodiment of which is illustrated in the accompanying drawings, in which the numeral 1 indicates any suitable threshing-machine provided with an endless feeding-apron 2 for directing the grain into the same. An auxiliary frame 3 is preferably carried above and extends forwardly of the apron 2 and carries a similar apron 4, designed to receive grain and discharge the same onto the apron 2. Vertical standards 5 5 rise from the framework of the machine 1 and are connected at their upper end by a strengthening cross-beam 6 and at intermediate points by cross-beams 7 and 8. Vertically-arranged parallel standards 10 10 connect the beams 7 and 8 and support a framework 11, which is pivoted thereto at its rear end position for swinging in a vertical plane. Journaled in the forward end of the frame 11 is a crank-shaft 12, provided with a series of cranks, preferably alternately diametrically opposite each other, each crank being engaged by a feeding-rod 13, carrying at its forward end a fork 14 and at its rear end pivoted to a portion of the framework 11. The shaft 12 carries a drive-wheel 15, which may receive power from any suitable source for causing the rods 13 to be given an oscillatory movement, thus producing a feeding action of the forks 14. Intermediate the length of the framework 11 and secured at any preferred point is a block 16, passing about the pulley of which is a cable 17, attached at its upper end to the beam 6 and at its lower end to a drum 18, journaled in brackets 19, carried by beam 7. A gear-wheel is carried by one of the extended journals of the drum 18 and is engaged by a worm 20, carried by shaft 21 and designed to be rotated for taking up or paying out the cable 17, said worm serving as a locking means for retaining the frame 11 in any given adjusted position. The shaft 21 may be provided with an operating handle or wheel 22 for facilitating rotation of the worm 20.

Rising above and extending forwardly from the standards 5 are beams 23, secured together at their upper ends by cross-beam 24 and retained in position by inclined braces 25 in the rear and a brace 26 in the front, the rear braces engaging the standards 5 and the front brace being secured to the frame 3. At each side of the center of the cross-beam 24 is secured a block 27, and about the pulley of each block is passed a cable 28, engaging at its front end a grain-carrying fork 29 and at its rear end a suitable winding-drum 30. The drums 30 and operating parts will be best seen by reference to Figs. 4 and 5. A shaf, 31 is journaled in the framework of the machine 1 and is designed to be driven by a suitable pulley 31', receiving power from any preferred source. Keyed or otherwise suitably fixed to the shaft 31 intermediate its length is a pulley 32, having a rim formed with beveled inner faces 32' 32', which constitute clutch-sections, the coacting clutch-sections being carried by the drums 30. The drums 30 are spaced apart longitudinally and rotatably mounted upon shaft 31, with the pulley 32 interposed between said drums. Suitable transversely-positioned bars 33 are fixed to the inner end of each drum 30, each bar 33 being slotted at its ends, as at 34 34, and detachably secured to gripper devices 35 35 by means of bolts or other securing means passed through said slots 34 into the gripping devices, said gripping devices being arranged in pairs and being adapted to engage the inner beveled face 32' of the corresponding side of pulley 32. The gripping devices 35 35 of each set are retained in a spaced-apart condition by means of rods 36, disposed between the same, each of said rods being provided at each end with an adjusting-nut 37, contacting with the edge of the respective gripping device 35, said nuts 37 being designed to be threaded longitudinally of the rods 36 for increasing or decreasing the distance between the grippers 35. The outer end of each drum 30 is provided with a flanged collar or pulley 38, engaged by a strap 39, passed about the same and connecting the two parts of an actuating-lever 40, pivoted to the framework of the machine 1. Movement of one of the levers 40 toward the clutch member 32 will cause the gripping devices 35 to engage the corresponding face 32' of pulley 32 and produce rotation of the drum 30 as long as such contact is maintained. The gripping devices 35 are designed to be adjusted laterally, as above set forth, for the purpose of taking up the wear between such devices and the respective face 32'.

In operation the wheel 22 may be rotated for adjusting the frame 11 vertically to the desired point, and an operator positioned on top of the machine 1 controls the levers 40 for effecting any desired movement of the forks 29. Of course an attendant is required for each of the forks 29.

Having thus fully described our invention, what we claim as new, and desire to secure by Letters Patent, is—

1. In a mechanism of the class described, the combination with grain-conveying means, of a drum for actuating the same, a shaft for imparting movement to said drum, a clutch member carried by said shaft, bars fixed to said drum, gripping devices carried by said bars, and means for moving said drum into position for causing said gripping devices to engage said clutch member.

2. In a mechanism of the class described, the combination with grain-feeding means, of a drum for actuating the same, a shaft for driving said drum, a clutch member carried by said shaft, bars fixed to said drum formed with slotted end, gripping devices secured to said bars by attaching means passed through said slots, and rods engaging said gripping devices for spreading the same.

3. In a hoist for threshing-machines, the combination with a rotatably-mounted shaft, of a pulley fixed thereto formed with a clutch member, a drum mounted on said shaft, a bar carried by said drum, a pair of gripping devices adapted to engage the clutch member of said pulley, means adjustably connecting said bar to said grippers, means for adjustably spacing said grippers apart, and hoisting apparatus actuated by said drum.

4. In a hoist for threshing-machines, the combination with a rotatably-mounted shaft, of a clutch member carried thereby, a rotatably-mounted drum, bars connected to said drum and formed with slots at their end, gripping devices carried by said bars, means extending through said slots for adjustably securing said gripping devices to said bars, spacing-rods interposed between said gripping devices, means carried by said rod for adjustably spacing said gripping devices apart, said gripping devices being adapted to be moved into and out of engagement with said clutch member, and hoisting apparatus actuated by said drum.

In testimony whereof we hereunto affix our signatures in presence of two witnesses.

NELS WALBERG.
FRED J. McARTHUR.

Witnesses:
CHAS. N. HARRIS,
F. J. McKENNEY.